US012712103B2

(12) United States Patent

Brunner et al.

(10) Patent No.: US 12,712,103 B2

(45) Date of Patent: Aug. 18, 2026

(54) CONTROL SYSTEM FOR CHARGING OF NON/PARTIALLY INSULATED SUPERCONDUCTING MAGNETS AND RELATED TECHNIQUES

(71) Applicant: Massachusetts Institute of Technology, Cambridge, MA (US)

(72) Inventors: Daniel Brunner, Cambridge, MA (US); Robert Mumgaard, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1257 days.

(21) Appl. No.: 17/616,362

(22) PCT Filed: Jun. 17, 2020

(86) PCT No.: PCT/US2020/038031

§ 371 (c)(1),
(2) Date: Dec. 3, 2021

(87) PCT Pub. No.: WO2020/257219

PCT Pub. Date: Dec. 24, 2020

(65) Prior Publication Data

US 2022/0359111 A1 Nov. 10, 2022

Related U.S. Application Data

(63) Continuation of application No. 16/444,784, filed on Jun. 18, 2019, now abandoned.

(51) Int. Cl.
*H01F 6/06* (2006.01)
*H01F 6/02* (2006.01)
(Continued)

(52) U.S. Cl.
CPC ................ *H01F 6/06* (2013.01); *H01F 6/02* (2013.01); *H01F 6/04* (2013.01); *H01F 6/008* (2013.01)

(58) Field of Classification Search
CPC ........................................................ H01F 6/06
See application file for complete search history.

(56) References Cited

U.S. PATENT DOCUMENTS 4,707,147 A 11/1987 Aoki et al.
4,921,661 A 5/1990 Leuer
(Continued)

FOREIGN PATENT DOCUMENTS

CN 108172308 6/2018
CN 114740244 A 7/2022
(Continued)

OTHER PUBLICATIONS

U.S. Appl. No. 17/796,481, filed Jul. 29, 2022, Radovinsky, et al.
(Continued)

*Primary Examiner* — Paul A Wartalowicz

(74) *Attorney, Agent, or Firm* — Daly, Crowley, Mofford & Durkee, LLP

(57) ABSTRACT

A system comprises a superconducting magnet comprising a coil of superconducting material. The coil includes electrical terminals. The windings of the coil are separated by a metallic conductor. A control circuit is coupled to the terminals to drive a current through the coil to charge the superconducting magnet and configured to provide a current through the coil that is sufficiently small to avoid a quenching effect of the superconducting magnet but also large enough to charge the magnet within a predetermined time period. A cooling structure is thermally coupled to the coil to remove heat caused by charging the superconducting magnet with the current to allow for the current to be sufficiently large to charge the magnet within the predetermined time period without causing the quenching effect.

20 Claims, 8 Drawing Sheets

(51) Int. Cl.

| | |
|---|---|
| ***H01F 6/04*** | (2006.01) |
| *H01F 6/00* | (2006.01) |

(56) References Cited

U.S. PATENT DOCUMENTS

| | | | | |
|---|---|---|---|---|
| 5,379,020 | A | 1/1995 | Meier et al. | |
| 5,426,408 | A | 6/1995 | Jones et al. | |
| 6,034,324 | A | 3/2000 | Dixon et al. | |
| 6,128,174 | A | 10/2000 | Ritter et al. | |
| 6,313,623 | B1 | 11/2001 | Kojovic et al. | |
| 6,624,624 | B1 | 9/2003 | Karrer et al. | |
| 6,900,714 | B1 | 5/2005 | Huang et al. | |
| 7,307,410 | B2 | 12/2007 | Shiokawa et al. | |
| 7,667,562 | B1 | 2/2010 | Weinstien | |
| 2005/0111159 | A1 | 5/2005 | Knight | |
| 2008/0106253 | A1 | 5/2008 | Kojovic | |
| 2008/0303511 | A1 | 12/2008 | Grno | |
| 2010/0073146 | A1 | 3/2010 | Kai et al. | |
| 2011/0026170 | A1 | 2/2011 | Husband et al. | |
| 2012/0214674 | A1* | 8/2012 | Blakes | H01F 6/02 505/211 |
| 2013/0063131 | A1 | 3/2013 | Chamarti et al. | |
| 2013/0099787 | A1* | 4/2013 | Lu | H02M 3/3376 324/319 |
| 2015/0213930 | A1 | 7/2015 | Hahn et al. | |
| 2016/0086707 | A1 | 3/2016 | Hahn et al. | |
| 2016/0156174 | A1 | 6/2016 | Kirby et al. | |
| 2017/0243681 | A1* | 8/2017 | Somerkoski | H01F 6/02 |
| 2017/0261574 | A1* | 9/2017 | Stainsby | G01R 33/3815 |
| 2018/0287407 | A1* | 10/2018 | Sayre | H02M 7/5387 |
| 2019/0011511 | A1 | 1/2019 | Stainsby et al. | |
| 2019/0088391 | A1* | 3/2019 | Hahn | H01F 6/06 |
| 2019/0239951 | A1* | 8/2019 | Mu | A61N 5/0616 |
| 2020/0194153 | A1 | 6/2020 | Brunner | |
| 2020/0402692 | A1 | 12/2020 | Brunner et al. | |
| 2022/0068528 | A1 | 3/2022 | Brunner | |
| 2023/0097465 | A1 | 3/2023 | Radovinsky et al. | |

FOREIGN PATENT DOCUMENTS

| | | | |
|---|---|---|---|
| EP | 0482840 | | 12/1994 |
| ES | 2438618 | A1 | 1/2014 |
| JP | S 6431400 | | 2/1989 |
| JP | H0572365 | | 3/1993 |
| JP | H08138927 | A | 5/1996 |
| JP | H 08-191538 | | 7/1996 |
| JP | H08191538 | A | 7/1996 |
| JP | 2000277322 | A | 6/2000 |
| JP | 2008041966 | A | 2/2008 |
| JP | 5594802 | B1 | 9/2014 |
| KR | 10-2004-0107948 | | 12/2004 |
| KR | 10-1194717 | B1 | 10/2012 |
| KR | 10-2016-0120984 | | 10/2016 |
| WO | WO 2011/002174 | A2 | 1/2011 |
| WO | WO 2011/074092 | A1 | 6/2011 |
| WO | WO 2017/193129 | A1 | 11/2017 |
| WO | WO 2020/132029 | | 6/2020 |
| WO | WO 2021/195383 | A1 | 9/2021 |
| WO | WO 2021/252765 | | 12/2021 |
| WO | WO 2022/149012 | A1 | 7/2022 |

OTHER PUBLICATIONS

U.S. Appl. No. 18/008,507, filed Dec. 6, 2022, Garnier, et al.

Chen, et al.; "Development of a Digital Quench Detection and Dumping Circuit With Constant Voltage System for SMES"; IEEE Transactions on Applied Superconductivity; vol. 20, No. 3; Jun. 2010; 4 Pages.

International Search Report and Written Opinion dated Apr. 29, 2020 for International Application No. PCT/2019/067116; 14 Pages.

International Preliminary Report on Patentability dated Jul. 1, 2021 for International Application No. PCT/US2019/067116; 11 Pages.

International Search Report and Written Opinion of the ISA dated Sep. 6, 2021 for International Application No. PCT/US2021/024130; 20 Pages.

International Preliminary Report on Patentability dated Dec. 22, 2022 for International Application No. PCT/US2021/036814; 11 Pages.

International Preliminary Report on Patentability dated Mar. 26, 2020 for International Application No. PCT/US2021/02430; 13 Pages.

International Search Report and Written Opinion of the ISA dated Jan. 26, 2022 for International Application No. PCT/US2021/020225; 15 Pages.

International Patent Cooperation Treaty PCT Third Party Observation dated Jul. 7, 2022 for International Application No. PCT/US2021/020225; 4 Pages.

International Communication In Cases For Which No Other Form Is Applicable dated Jul. 7, 2022 for International Application No. PCT/US2021/020225; NPL References; 15 Pages.

International Preliminary Report on Patentability dated Sep. 22, 2022 for International Application No. PCT/US2021/020225; 11 Pages.

International Search Report and Written Opinion of the ISA dated Mar. 15, 2023 for International Application No. PCT/US2022/049517; 15 Pages.

Markiewicz, et al.; "900 MHz Wide Bore NMR Spectrometer Magnet at NHMFL"; IEEE Transactions on Applied Superconductivity; vol. 10, No. 1; Mar. 2000; 4 Pages.

Marchevsky; "Protection of Superconducting Magnet Circuits"; Lawrence Berkeley National Laboratory; USPAS 2017; http://uspas.fnal.gov/materials/17UCDavis/MachineProtection/uspas_mm.pdf; 29 pages.

Liao, et al.; "Signal De-Noising of Quench Detection by Real-Time Wavelet Analysis Algorithm for HTS Coil and Magnet"; IEEE Transactions on Applied Superconductivity; vol. 27, No. 4; Jun. 2017; 5 Pages.

Response to communication pursuant to Rules 161(2) and 162 EPC for European Application No. 21743319.2 as filed on Jul. 27, 2023; 15 Pages.

Suetomi, et al.; "A Novel Winding Method for a no-insulation layer-wound REBCO Coil to Provide a Short Magnetic Field Delay and Self-Protect Characteristics"; Superconductor Science and Technology; vol. 32, No. 4; Feb. 20, 2019; 14 Pages.

Tanaka, et al.; "Development of the Current Bypassing Methods into the Transverse Direction in Non-insulation HTS Coils"; Physics Procedia; 27$^{th}$ International Symposium on Superconductivity; vol. 65; Jan. 1, 2015; 4 Pages.

International Preliminary Report on Patentability dated Dec. 30, 2021 for International Application No. PCT/US2020/038031; 16 Pages.

Communication Pursuant to Rules 161(1) and 162 EPC dated Jan. 25, 2022 for European Application No. 20736847.3; 3 Pages.

Response (with Amended Description and Claims) to Communication Pursuant to Rules 161(1) and 162 EPC dated Jan. 25, 2022 for European Application No. 20736847.3; Response filed on Jul. 25, 2022; 49 Pages.

Response to Final Office Action (with English translation of Amended Claims) dated Nov. 11, 2024 for Korean Patent Application No. 10-2021-7041886; Response filed on Jan. 7, 2025; 19 pages.

European Examination Report dated Feb. 4, 2025 for European Patent Application No. 21743319.2; 4 pages.

Japanese Office Action (with English translation) dated Jan. 20, 2025 for Japanese Patent Application No. 2022-575308; 12 pages.

Korean Office Action (with English translation) dated May 23, 2024 for Korean Application No. 10-2021-7041886; 18 pages.

Office Action dated Jan. 30, 2025, for U.S. Appl. No. 17/312,784; 24 pages.

Response to Office Action dated Jan. 30, 2025, for U.S. Appl. No. 17/312,784; Response filed Apr. 18, 2025; 20 pages.

Response to European Examination Report dated Jun. 26, 2024 for European Patent Application No. 20736847.3; Response filed on Nov. 25, 2024; 16 pages.

Korean Final Office Action (with English translation) dated Nov. 11, 2024 for Korean Patent Application No. 10-2021-7041886; 5 pages.

(56) References Cited

OTHER PUBLICATIONS

Final Office Action dated Jul. 15, 2025, for U.S. Appl. No. 17/312,784; 29 pages.
International Search Report and Written Opinion dated Sep. 7, 2020 for International Application No. PCT/US2020/038031; 22 Pages.
Response to Korean Office Action dated May 23, 2024 for Korean Patent Application No. 10-2021-7041886; Response (with English translation of Amended Claims) filed on Sep. 23, 2024; 95 pages.
Japanese Office Action (with English translation) dated Jun. 12, 2024 for Japanese Patent Application No. 2021-574940; 12 pages.
Response to Japanese Office Action (with English translation) dated Jun. 12, 2024 for Japanese Patent Application No. 2021-574940; Response filed on Nov. 12, 2024; 29 pages.
PCT International Search Report and Written Opinion dated Jun. 5, 2024 for International Application No. PCT/US2024/013492; 14 Pages.
Examination Report dated Jun. 26, 2024 for European Patent Application No. 20736847.3; 8 pages.
Berzak et al., "Magnetic Diagnostics for Equilibrium Reconstructions in the Presence of Nonaxisymmetric Eddy Current Distributions in Tokamaks (invited);" Review of Scientific Instruments, vol. 81, No. 10; Oct. 14, 2010; 7 Pages.
Chavan et al., "The Magnetics Diagnostic Set for ITER;" Journal Article from Fusion Engineering and Design, vol. 84; Available Online Feb. 4, 2009; pp. 295-299; 5 Pages.
Chen et al., "Upgrade of the Magnetic Diagnostic System for Restart of HT-6M Operation;" Chinese Physics B, vol. 31, No. 12; Jul. 8, 2022; 9 Pages.
Costley, "Towards Diagnostics for a Fusion Reactor;" IEEE Transactions on Plasma Science, vol. 38, No. 10; Oct. 2010; 10 Pages.
Gerhardt et al., "Techniques for the Measurement of Disruption Halo Currents in the National Spherical Torus Experiment;" Review of Scientific Instruments, vol. 82; Oct. 1, 2011; 9 Pages.
Granetz et al., "Magnetic Diagnostics in Alcator C-MOD;" Review of Scientific Instruments, vol. 61, No. 10, Part II; Oct. 1990; 3 Pages.
Hartfuss et al., "Diagnostics for Steady State Plasmas;" Topical Review; Plasma Physics and Controlled Fusion, vol. 48, No. 10; Oct. 1, 2006; 68 Pages.
Lee et al., "Magnetic Diagnostics for Korea Superconducting Tokamak Advanced Research;" Review of Scientific Instruments, vol. 72, No. 1; Jan. 2001; 3 Pages.
Moreau et al., "Development of a Magnetic Diagnostic Suitable for the ITER Radiation Environment;" Proceedings of the 1st International Conference on Advancements in Nuclear Instrumentation, Measurement Methods and Their Applications (ANIMMA 2009); Jun. 2009; 8 Pages.
Moreau et al., "The New Magnetic Diagnostics in the WEST Tokamak;" Review of Scientific Instruments, vol. 89, No. 10; Jul. 26, 2018; 5 Pages.
Neyatani et al., "Development of Magnetic Sensors in JT-60 Upgrade;" Proceedings of the IEEE/NPSS Symposium on Fusion Engineering; Sep. 30-Oct. 3, 1991; 6 Pages.
Shakeri et al., "Measurement of Plasma Current in Damavand Tokamak Using Magnetic Probes Assembly as a Discrete Rogowski Coil;" Fusion Engineering and Design, vol. 168; Mar. 2, 2021; 7 Pages.
Strait, "Magnetic Diagnostic System of the DIII-D Tokamak;" Review of Scientific Instruments, vol. 77, No. 2; Feb. 9, 2006; 14 Pages.
Sushkov et al., "Design of Inductive Sensors and Data Acquisition System for Diagnostics of Magnetohydrodynamic Instabilities on the T-15MD Tokamak;" Fusion Engineering and Design, vol. 146; Dec. 31, 2018; 5 Pages.
PCT Invitation to Pay Additional Fees and Partial Search Report dated Feb. 19, 2024 for International Application No. PCT/US2023/076758; 11 Pages.
PCT International Search Report and Written Opinion dated Apr. 9, 2024 for International Application No. PCT/US2023/076758; 28 Pages.
European Communication pursuant to Article 94(3) EPC dated Dec. 11, 2025 for European Patent Application No. 20736847.3; 20 pages.
Response to Final Office Action dated Jul. 15, 2025 for U.S. Appl. No. 17/312,784; Response (with RCE) filed on Dec. 12, 2025; 21 pages.
Response to Japanese Office Action (with machine English translation) dated Jan. 20, 2025 for Japanese Patent Application No. 2022-575308; Response filed on Apr. 23, 2025; 10 pages.
Japanese Office Action (with English translation) dated May 12, 2025 for Japanese Patent Application No. 2022-575308; 12 pages.
Response to Japanese Office Action (with machine English translation) dated May 12, 2025 for Japanese Patent Application No. 2022-575308; Response filed on Sep. 10, 2025; 12 pages.
Japanese Final Office Action (with English translation) dated Oct. 28, 2025 for Japanese Patent Application No. 2022-575308; 5 pages.
Response to Communication Pursuant to Rule 161(1) and 162 EPC dated Jun. 19, 2024, for European Application No. 22826743.1, filed on Dec. 18, 2024; 14 pages.
Notice of Allowance dated Jan. 23, 2026 for European Application No. 21743319.2; 8 Pages.
Office Action dated Nov. 27, 2025 for Korean Application No. 10-2022-7043417 with English Translation; 13 Pages.
Response to Office Action for Japanese Application No. 2022-575308 as filed on Dec. 25, 2025, with English Translation; 12 Pages.
Notice of Allowance dated Jan. 21, 2026 for Japanese Application No. 2022-575308 with English Translation; 5 Pages.
Japanese Petition for responding to the Reconsideration Report dated Jun. 20, 2025 for Japanese Patent Application No. 2021-574940; Petition (with machine English translation) dated Nov. 12, 2025; 10 pages.
Korean Notice of Allowance (with English translation) dated Apr. 18, 2025 for Korean Patent Application No. 10-2021-7041886; 9 pages.

* cited by examiner

CONTROL SYSTEM FOR CHARGING OF NON/PARTIALLY INSULATED SUPERCONDUCTING MAGNETS AND RELATED TECHNIQUES

CROSS REFERENCE TO RELATED APPLICATIONS

This application is a U.S. National Stage of International Application PCT/US2020/038031 filed in the English language on Jun. 17, 2020 and entitled "CONTROL SYSTEM FOR CHARGING OF NON/PARTIALLY INSULATED SUPERCONDUCTING MAGNETS AND RELATED TECHNIQUES," which is a continuation of U.S. patent application Ser. No. 16/444,784 filed Jun. 18, 2019, the contents of which are hereby incorporated by reference as if fully set forth herein.

FIELD

This disclosure relates to superconducting magnets and, more particularly, to superconducting magnets using partial- and no-insulation and control systems, apparatus and methods for controlling superconducting magnets.

BACKGROUND

Superconducting magnets having partial- and/or no-insulation (PI/NI) between the superconducting turns may be used because they can be designed to be passively safe during quenches. A quench is the transition from a superconductor to a normal (i.e., non-superconducting) conductor due to the current in the superconductor exceeding a threshold in the operating magnetic field, temperature, and/or current density. A quench can deposit a significant amount of the energy stored in the magnetic field as thermal energy in a small volume of the magnet, which may cause damage to some or all portions of the superconducting magnet. PI/NI magnets can avoid this by allowing the current to flow around the quench zone to adjacent superconducting turns and/or couple the quench electromagnetically to adjacent turns.

SUMMARY

In an embodiment, a system comprises a superconducting magnet which itself comprises a coil of superconducting material. The coil includes two electrical terminals. Windings of the coil are separated by a metallic conductor. A control circuit is coupled to the two terminals to direct or otherwise drive a current through the coil to charge the superconducting magnet. Further, the control circuit is configured to provide a current through the coil that is sufficiently small to avoid a quenching effect of the superconducting magnet but also large enough to charge the magnet within a predetermined time period. A cooling structure is thermally coupled to the coil to remove heat caused by charging the superconducting magnet with the current to allow for the current to be sufficiently large to charge the magnet within the predetermined time period without causing the quenching effect.

One or more of the following features may be included either individually or in combination.

The cooling structure may be configured to maintain a temperature of the coil at 4 K or higher.

The control circuit may comprise one or more feedback loops.

The one or more feedback loops may feedback a temperature of the coil.

The one or more feedback loops may feedback a current through the coil.

The one or more feedback loops may feedback a magnetic field of the coil.

The control circuit may include a model of the coil.

The model may include a temperature limit of the coil, a current limit of the coil, and a magnetic field limit of the coil.

The temperature limit, the current limit, and the magnetic field limit may define a region within which the coil acts as a superconductor.

In another embodiment, a method of controlling a superconducting magnetic coil includes driving, by a variable current supply, a current through the superconducting magnetic coil; monitoring, by a control circuit, the current through the superconducting magnetic coil, a temperature of the superconducting magnetic coil, and a magnetic field about the superconducting magnetic coil; comparing, by the control circuit, the temperature, current, and magnetic field to a model of the superconducting magnetic coil stored in the control circuit to determine a current operating point of the superconducting magnetic coil; determining a maximum current that can be used to charge the coil based on the operating point of the superconducting magnetic coil and the operating range of the superconducting magnetic coil; and adjusting the current to match the maximum current to energize the superconducting magnetic coil. The model defines an operating range for the superconducting magnetic coil within which the coil acts as a superconductor One or more of the following features may be included.

The control circuit may control a cooling system to cool the superconducting magnetic coil while applying the maximum current so that the superconducting magnetic coil remains in the operating range.

The cooling structure may be configured to maintain a temperature of the coil at 4 K or higher.

The control circuit may further comprise one or more feedback loops.

The one or more feedback loops may feedback a temperature of the coil.

The one or more feedback loops may feedback a current through the coil.

The one or more feedback loops may feedback a magnetic field of the coil.

The model may include a temperature limit of the coil, a current limit of the coil, and a magnetic field limit of the coil.

The temperature limit, the current limit, and the magnetic field limit may define a region within which the coil acts as a superconductor.

Windings of the superconducting magnetic coil may be separated by a metallic conductor.

Some embodiments relate to a method for controlling a superconducting magnet having no or partial electrical insulation between respective turns of the superconducting magnet, the method comprising: sensing a physical characteristic of the superconducting magnet using a sensor; determining, using a control circuit, an electrical parameter to supply to the superconducting magnet based on the sensed physical characteristic and a model of the superconducting magnet stored in a computer-readable storage medium; and providing the determined electrical parameter to the superconducting magnet.

The physical characteristic may comprise temperature, voltage, current magnetic field and/or magnetic flux density.

The electrical parameter may comprise of a current and/or voltage.

The model may represent a critical current of a superconductor of the superconducting magnet based on temperature, magnetic field and/or magnetic flux density.

The method may further comprise: after a time interval from the sensing of the physical characteristic, re-sensing the physical characteristic; re-determining, using a control circuit, the electrical parameter to supply to the superconducting magnet based on the re-sensed physical characteristic and the model; and providing the re-determined electrical parameter to the superconducting magnet.

The determining may be performed using feedback.

The determining may comprise calculating a critical current of a superconductor of the superconducting magnet, calculating an error of the critical current with respect to a setpoint and setting the electrical parameter based on the error.

The calculating of the error may comprise dividing a calculated current through the superconductor by the critical current to produce a ratio, and comparing the ratio to a setpoint.

The determining may comprise calculating future parameters of the superconducting magnet based on the sensed physical characteristic and the model, and setting the electrical parameter based on the calculated future parameters.

The model may comprise a thermal model of the superconducting magnet.

The method may further comprise determining a degree of cooling based on the model and the sensed physical characteristic, and controlling a cooling system for the superconducting magnet based on the determined degree of cooling.

Some embodiments relate to a computer-readable medium having stored thereon instructions, which, when executed by a processor, perform the method.

Some embodiments relate to an apparatus for controlling a superconducting magnet having no or partial electrical insulation between respective turns of the superconducting magnet, the apparatus comprising: a control circuit configured to: receive a sensed physical characteristic of the superconducting magnet from a sensor; determine an electrical parameter to supply to the superconducting magnet based on the sensed physical characteristic and a model of the superconducting magnet stored in a computer-readable storage medium; and provide the determined electrical parameter to the superconducting magnet.

The physical characteristic may comprise temperature, voltage, current, magnetic field and/or magnetic flux density.

The electrical parameter may comprise a current and/or voltage.

The model may represent a critical current of a superconductor of the superconducting magnet based on temperature, magnetic field and/or magnetic flux density.

The control circuit may be further configured to: after a time interval from the sensing of the physical characteristic, re-sensing the physical characteristic; re-determining, using a control circuit, the electrical parameter to supply to the superconducting magnet based on the re-sensed physical characteristic and the model; and providing the re-determined electrical parameter to the superconducting magnet.

The determining may be performed using feedback.

The determining may comprise calculating a critical current of a superconductor of the superconducting magnet, calculating an error of the critical current with respect to a setpoint and setting the electrical parameter based on the error.

The calculating of the error may comprise dividing a calculated current through the superconductor by the critical current to produce a ratio, and comparing the ratio to a setpoint.

The determining may comprise calculating future parameters of the superconducting magnet based on the sensed physical characteristic, and setting the electrical parameter based on the calculated future parameters.

The model may comprise a thermal model of the superconducting magnet.

The control circuit may be configured to determine a degree of cooling based on the model and the sensed physical characteristic, and controlling a cooling system for the superconducting magnet based on the determined degree of cooling.

Some embodiments relate to a system, comprising: a superconducting magnet having no or partial electrical insulation between respective turns of the superconducting magnet; a control circuit configured to: receive a sensed physical characteristic of the superconducting magnet from a sensor; determine an electrical parameter to supply to the superconducting magnet based on the sensed physical characteristic and a model of the superconducting magnet stored in a computer-readable storage medium; and provide the determined electrical parameter to the superconducting magnet.

The foregoing summary is provided by way of illustration and is not intended to be limiting.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more exemplary embodiments. Accordingly, the figures are not intended to limit the scope of the invention. Like numbers in the figures denote like elements.

DETAILED DESCRIPTION

Figure 1:
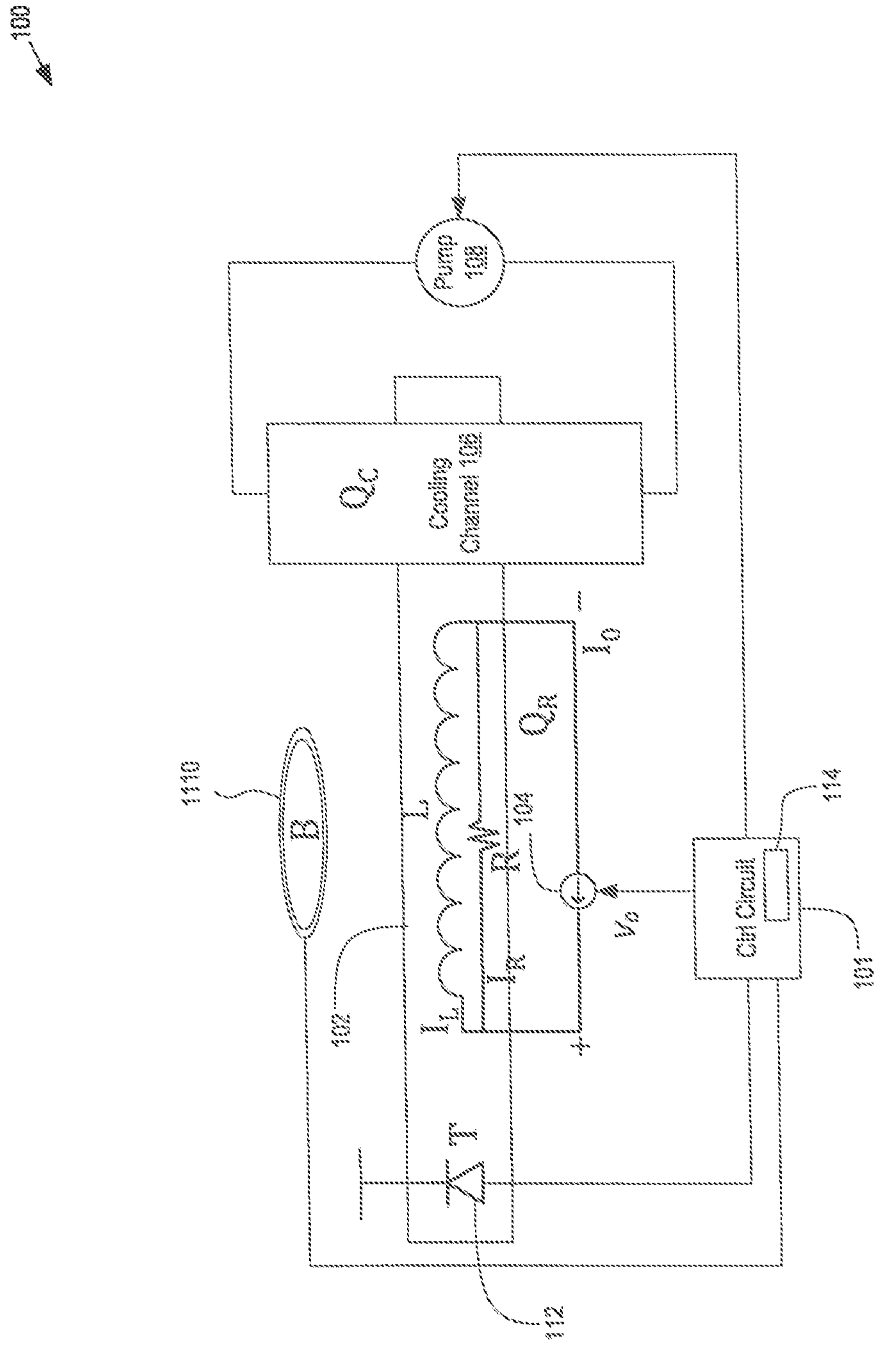
FIG. 1 is a block diagram of a magnetic coil and control circuit.

In accordance with one aspect of the concepts described herein, it has been recognized that the reduction and/or entire elimination of insulation in a superconducting magnet means that voltages generated between the PI/NI superconducting layers (e.g., inductive voltages generated during charging and discharging) may cause a current to flow through any electrically conductive layers. This typically effectively places a resistance (R) in parallel with an inductance (L) of the superconducting magnet, thereby effectively forming a parallel L-R circuit.

Such a situation can be problematic for at least two reasons. First, superconducting magnets are often charged with a current-controlled power source. In PI/NI magnets, the charging or discharging time may be on the order of the L/R timescale, which can be up to many hours for large-L, low-R PI/NI magnets. Because of this, PI/NI superconducting magnets are typically only used for DC magnets (e.g., which, when charged, have a substantially constant current), though the techniques and apparatus described herein are not limited in this respect. Second, the current flowing through the resistive portion of the magnet generates heat. Generation of heat runs contrary to the need to keep the superconductor at a sufficiently cold temperatures such that it maintains its superconducting properties. The heat generated by the resistive portion of the magnet needs to be sufficiently removed (e.g., by a cooling system) to maintain the superconductor at a sufficiently low temperature.

To overcome the limitation of slow charging times, the coil terminals can effectively be overdriven, providing a large voltage across the inductor to increase the ramp rate of current in the superconductor. However, this also increases the current flowing through the resistive portion of the magnet. Described herein is a control system that can control a current and/or voltage provided to a superconducting magnet to reduce or minimize charging time while also avoiding overheating the magnet to a temperature beyond which the superconductor loses its superconducting properties.

This disclosure relates to control systems for superconducting magnets for use in a wide variety of applications. As will be discussed below, the superconducting magnets may comprise a coil of superconducting material through which current flows to generate a magnetic field.

Before proceeding with a description of illustrative control circuits for use with superconducting magnets, some introductory concepts are explained. It should be appreciated that while reference may be made herein to specific applications, such references are made solely to promote clarity in explaining the broad concepts described herein. It should be appreciated that the concepts, systems, circuits and techniques described herein find use in a wide variety of different applications.

For example, after reading the description provided herein, one of ordinary skill in the art will readily appreciate that the concepts, systems, circuits and techniques described herein are generally applicable for use in a wide range of applications (e.g. a wide range of industrial uses) which may make use of high-field magnets and that the described control concepts, control systems, control circuits and control techniques may facilitate commercialization of high-field magnets for use in a wide variety of different applications. Such applications include but are not limited to: applications in the medical and life sciences field (e.g., magnetic resonance imaging (MRI) and spectroscopy); applications in the chemistry, biochemistry and biology fields (e.g., nuclear magnetic resonance (NMR), NMR spectroscopy, electron paramagnetic resonance (EPR), and Fourier-transform ion cyclotron resonance (FT-ICR)); applications in particle accelerators and detectors (e.g., for use in health care applications such as in instruments for radiotherapy); application in devices for generation and control of hot hydrogen plasmas; applications in the area of transportation; applications in the area of power generation and conversion; applications in heavy industry; applications in weapons and defense; applications in the area of high-energy particle physics; and applications in the area of nuclear fusion power plants (e.g., compact nuclear fusion power plants).

Thus, although reference is sometimes made herein to the use of high-field magnet assemblies including the subject control circuits in connection with a specific application (e.g. nuclear fusion (fusion) or MRI) such references are not intended to be, and should not be construed as, limiting. Rather, it should be appreciated that control circuits and systems for high-field magnet assemblies provided in accordance with the concepts described herein may find use in a wide variety of applications.

Referring now to FIG. 1, a system 100 for controlling magnetic coil 102 may include control circuit 101 to monitor magnetic coil 102, control (and ideally optimize) current ramping and cooling as well as to avoid or at least reduce the occurrence of quenching. Control circuit 101 may be coupled to a variable current or voltage source 104 that drives current through magnetic coil 102. Control circuit 101 may vary the current through magnetic coil 102 by controlling variable current or voltage source 104.

A cooling system may be coupled to magnetic coil 102 to control the temperature of magnetic coil 102. In embodiments, the temperature setpoint of the cooling system may be variable and set by the control circuit 101 based on a model of magnetic coil 102, which will be discussed below. However, in some embodiments, the cooling system may have a constant temperature setpoint. The cooling system may include a cooling channel 106 thermally coupled to magnetic coil 102. For example, the cooling channel 106 may be configured to flow a cryogenic fluid (e.g., liquid helium or liquid nitrogen) or other cooling fluid therethrough to remove heat from the magnetic coil 102. Alternatively or additionally, a conduction cooling system may be used that conducts heat away through a thermal conductor without flowing a cryogenic fluid through cooling channel 106. In embodiments, cooling channel 106 may be closely thermally coupled to magnetic coil 102 to maximize the cooling that liquid cooling channel 106 can provide to the coil. For example, cooling channel 106 may be physically coupled to a thermal conductor (such as a copper strip or plate, not shown), which in turn is directly physically coupled to magnetic coil 102.

In embodiments, cooling channel 106 may include a pipe or tube that flows a cooling fluid. Pump 108 may pump the cooling fluid through cooling channel 106 so that it circulates through magnetic coil 102 and removes heat. Although not shown, the cooling system may also include a condenser, a compressor, a cooling vat, a cooling tower, etc.

In embodiments, magnetic coil 102 may include a so-called high temperature superconductor. In this case, the cooling system may be configured to maintain the temperature of magnetic coil 102 at 4 Kelvin, 10 Kelvin, or higher, but sufficiently low to maintain the superconducting properties of the high temperature superconductor when the magnet is in operation.

Control circuit 101 may also be coupled to control the cooling system. For example, control circuit 101 may control pump 108, a condenser (not shown), a compressor (not shown) or other elements of the cooling system to provide cooling to magnetic coil 102. In some embodiments, control circuit 101 may be able to control the amount of cooling that the cooling system provides to magnetic coil 102 by operating pump 108 at different speeds, by adjusting valves, by turning a compressor or condenser on and off, etc. In other embodiments, the cooling system may cool the magnetic coil at a constant rate.

Control circuit 101 may monitor the state of magnetic coil 102. For example, control circuit 101 may be coupled to a magnetic field sensor 1110 to monitor the strength of the magnetic field produced by magnetic coil 102. Although shown as a loop sensor, magnetic field sensor 1110 may be a Hall effect sensor, a magnetoresistance element, or any type of magnetic field detection device.

Control circuit 101 may be coupled to temperature sensor 112, which may be thermally coupled to magnetic coil 102 so that control circuit 101 can monitor the temperature of magnetic coil 102. In some embodiments a single temperature sensor 112 may be included. In other embodiments, a plurality of temperature sensors may be used to sense the temperature at different locations of the magnetic coil 102.

Additionally, because control circuit 101 controls current or voltage source 104, control circuit 101 may monitor the amount of current flowing through magnetic coil 102 and/or the voltage across magnetic coil 102. In embodiments, system 100 may include a current or voltage sensor (e.g. coupled to magnetic coil 102 and/or current source 104) that can sense the amount of current flowing through magnetic coil 102 and/or the voltage across magnetic coil 102. In this case, control circuit 101 may be coupled to the current or voltage sensor and may use the current or voltage sensor to monitor the current flowing through magnetic coil 102 or the voltage across magnetic coil 102. In embodiments, such measurements may be made at the terminals of the magnetic coil that are connected to current or voltage source 104.

Control circuit 101 may be implemented as a custom logic circuit, a programmed FPGA, a general-purpose computer programmed with software, a special-purpose computer programmed with software, or any type of circuit, system, or computing device that can act as a control system to control cooling to and current through magnetic coil 102. In embodiments, control circuit 101 may include a memory 114 that can store data for use by control circuit 101. Memory 114 may be a non-volatile memory such as an EPROM, a volatile memory that is loaded with the data used by control circuit 101, or a hard-programmed memory such as a logic circuit that acts as a memory. In embodiments, memory 114 may store data representing an operating model for magnetic coil 102.

Figure 2:
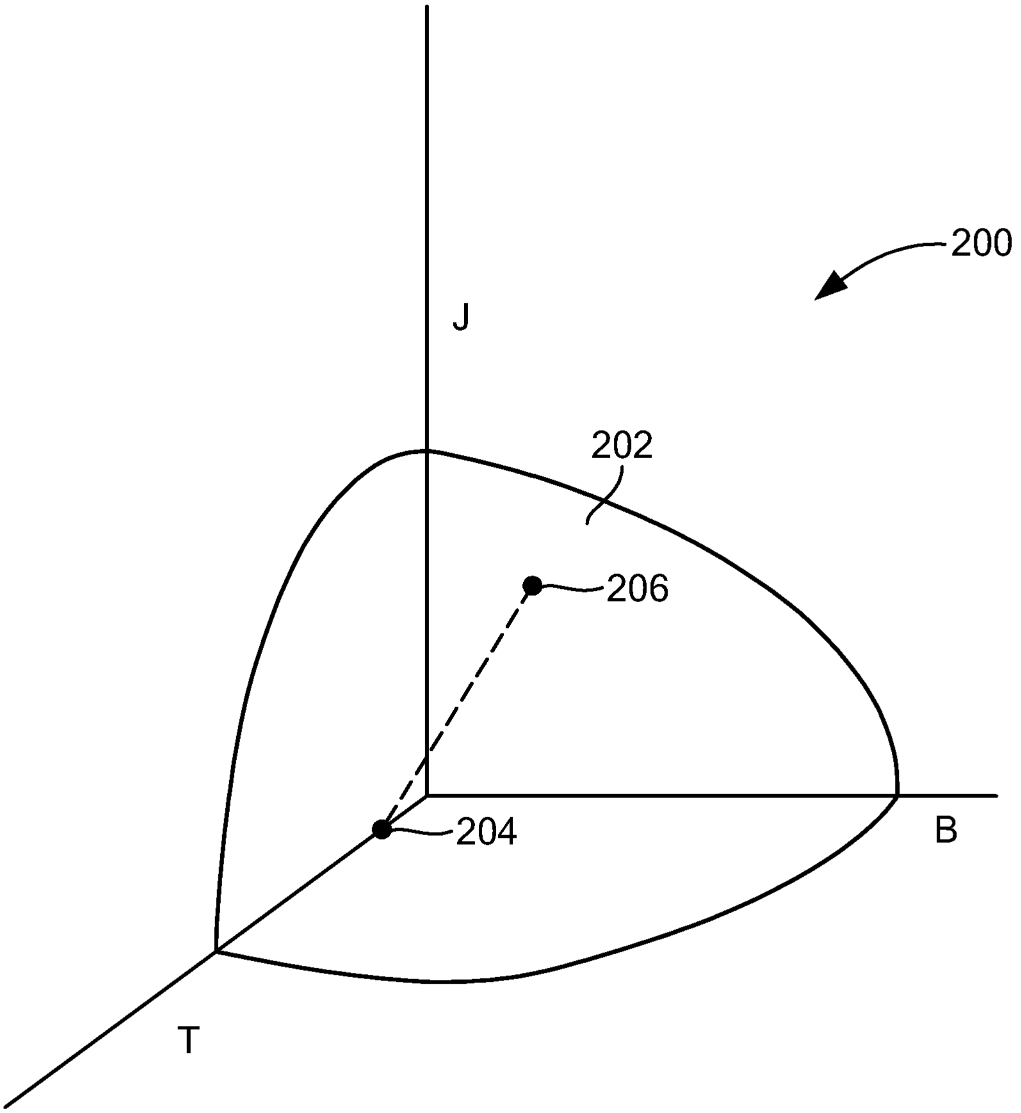
FIG. 2 is a three-dimensional graph of an operational model of a superconducting magnet.

Referring now to FIG. 2, the three-dimensional graph represents an operating model 200 for magnetic coil 102 (and/or a superconducting tape), according to some embodiments. The J axis represents the current density flowing through the superconductor, the B axis represents the magnetic field or magnetic flux density to which a magnetic coil or superconducting tape (e.g. coil 102 or tape 508) is exposed (produced by current flowing through the magnetic coil 102 as well as any magnetic field sources external to the magnetic coil 102), and the T axis represents the temperature of magnetic coil (e.g. coil 102) and/or superconducting tape.

Curve 202 represents the boundary of superconductivity of a magnetic coil (e.g. coil 102) and/or a superconducting tape. While the magnetic coil (or tape) is operating below curve 202, it may act as a superconductor. However, if the current density J, magnetic field or flux density B, and/or temperature T becomes too high and the operating point moves above curve 202, the magnetic coil (or tape) may lose its superconducting properties, in whole or in part, and begin to quench.

Using model 200, control circuit 101 may be able to provide the maximum rate change of current to magnetic coil 102 in order to energize magnetic coil 102 without allowing magnetic coil 102 to quench. For example, assume that point 204 represents the state of magnetic coil 102 at start-up, before any current is flowing through magnetic coil 102 (i.e., point 204 occurs at a finite value of temperature (T) and at zero current density (J) and zero magnetic field or flux density (B)). To energize magnetic coil 102, control circuit 101 may provide a terminal current and/or voltage such that the current density J in the superconductor is at or below point 206 without causing magnetic coil 102 to quench. Generally, as the current density J increases, the magnetic field B increases linearly. As the magnetic field B and temperature T change, control circuit 101 can change the amount of current flowing through magnetic coil 102 and/or the amount of cooling provided to magnetic coil 102 so that magnetic coil 102 remains in a superconducting state. Control circuit 101 may reduce (and ideally minimize) the time it takes to energize magnetic coil 102 by providing an increased current (and ideally a maximum or near maximum current) to magnetic coil 102 while keeping the operating point of magnetic coil 102 below surface 202. In some embodiments, the three-dimensional surface of FIG. 2 may be simplified to a two-dimensional surface based on assuming that the magnetic field is due to the current through the magnet. In other words, since B is linearly related to $I_L$, a two-dimensional surface (i.e., a two-dimensional curve) may be used.

In embodiments, data representing model 200 may be stored in memory 114. Model 200 may be represented as a formula, a series of formulas, a data table, a lookup table, or any other type of data that can be used to represent the superconducting operating of magnetic coil 102.

Control circuit 101 may implement one or more control techniques to control the current or voltage provided to magnetic coil 102. Before describing examples of such techniques some parameters of the system will be described. Any of the following parameters and equations may be included in a model of the system used by control circuit 101.

System properties:

t=time (measurable)

B=Magnetic field (measurable), is linearly proportional to current in the superconductor T=Temperature of magnet (measurable)

L=Inductance of superconducting windings of magnet (known property)

R=Cross-turn resistance of the magnet (known property)

$I_0$=Power supply current (directly controllable)

$V_0$=Power supply voltage (directly controllable)

$I_L$=Current in superconductor (calculable)

$I_R$=Cross-turn current (calculable)

$I_c$=Critical current of the superconductor (known property), depends on temperature and magnetic field. The critical current $I_c$ may be defined as the current at which the superconductor loses its superconducting properties for a given magnetic field and temperature.

$Q_R$=Heat generated in the magnet by the cross-turn resistance (calculable)

$Q_C$=Cooling power supplied to the magnet (directly controllable)

V=Volume of the magnet cold mass (known property)

ρ=Density of the magnet cold mass (known property)

$C_p$=Heat capacity of the magnet cold mass (known property)

Circuit equations $I_0=I_R+I_L$ $V_0=V_R=V_L$ $V_R=I_RR$ $$V_L = L\frac{dI_L}{dt}$$

Heat equations $$Q_R = I_R^2 R$$

$$\frac{dT}{dt} = V\rho C_p(Q_R - Q_C)$$

Magnet equation $B \propto I_L$ (proportionality of the magnetic field at a given location can be a complex function of sensor location and magnet geometry)

In some embodiments, the control circuit 101 may implement feedback control. One example of implementing feedback control is to compare the inductor current $I_L$ and the critical current $I_c$, and control the current and/or voltage provided by current and/or voltage source 104 to minimize the difference between $I_c$ and $I_L$, with a suitable offset provided to $I_c$ to avoid a quench. For example, the control circuit 101 may be controlled to minimize the difference or "error" between $I_c$—delta and $I_L$, where delta is an offset. Delta may be any suitable value, such as a fixed value or a percentage of $I_c$, such as 20% or less, 10% or less, 5% or less, etc. One way of comparing $I_c$ and $I_L$ is to calculate $I_L/I_c$, and this value may be compared to a setpoint. The setpoint may be a value greater than zero, and less than one by an amount suitable for avoiding quench. For example, the setpoint may be 0.8 or greater, such as 0.9 or greater, such as 0.95 or greater, and less than one. The relationship between and magnetic field and/or temperature may be stored by the control circuit 101. As mentioned above, the magnetic field and/or temperature of the magnetic coil may be measured, and updates to the measurements may be provided over time to the control circuit 101. The control circuit may regularly re-calculate based on the updated measurements of the system (e.g. magnetic field and/or temperature). Such re-calculations may be performed at any suitable rate or interval. The error may be re-calculated continuously or at suitable intervals, and the voltage and/or current provided by the voltage and/or current source 104 may be updated accordingly. Any suitable type of feedback control may be used, one example of which is PID control that uses a suitable combination of proportional, integral and/or derivative error control. However, the techniques described herein are not limited in this respect, as any of a variety of feedback control techniques may be used.

Another feedback technique involves using a more complete model of the system. For example, a more complete model of the system may include a coupled electromagnetic and thermal model of the system. In some embodiments, the future characteristics of the system such as temperature, current and critical current may be simulated based on measured characteristics of the superconducting magnet, and a suitable current and/or voltage to be produced by control circuit 101 may be determined (e.g., by direct calculation and/or optimization). The system may be re-simulated at suitable intervals during charging of the magnet to continuously re-evaluate a suitable (e.g., optimum) current and/or voltage to be produced by the control circuit 101 based on updated sensor measurements.

Figure 3:
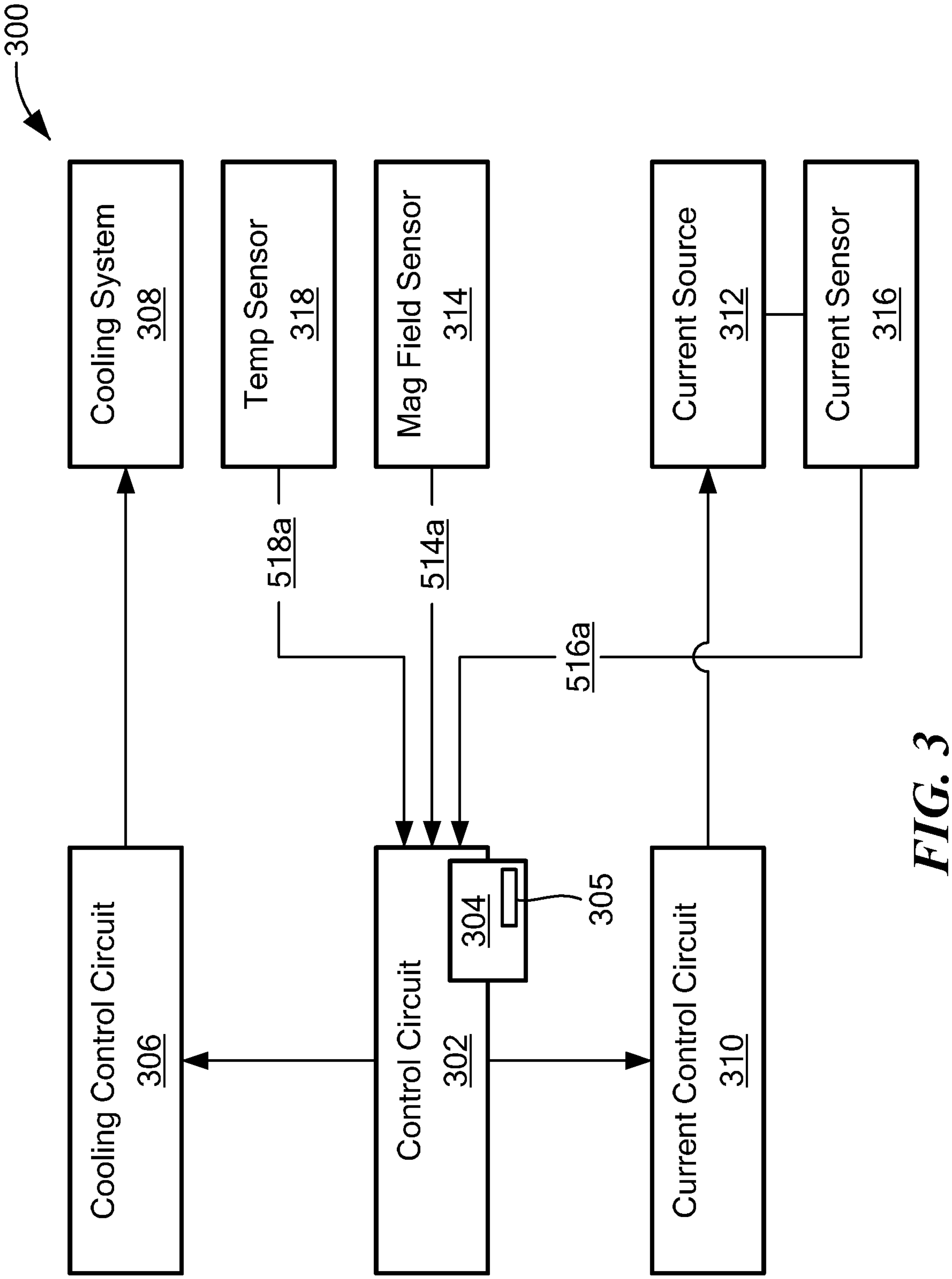
FIG. 3 is a block diagram of an embodiment of a control circuit for a superconducting magnet.

Referring now to FIG. 3, a block diagram illustrates a control system 300 for controlling a magnetic coil. Control system 300 may be the same as or similar to the control system described above in connection with FIG. 1.

Control system 300 may include a control circuit 302 with a memory 304. In embodiments, memory 304 may contain data representing an operating model 305 of a magnetic coil, like the operating model shown in FIG. 2. Control circuit 302 may be coupled to a cooling control circuit 306 that controls a cooling system 308. Cooling system 308 may be the same as or similar to the cooling system described above in connection with FIG. 1.

Control circuit 302 may also be coupled to current control circuit 310 which may control current source 312. Current source 312 may be the same as or similar to current or voltage source 104 in FIG. 1. Note that in other embodiments, current control circuit 310 may be replaced by a voltage control circuit that controls voltage applied to the superconducting magnet.

In embodiments, cooling control circuit 306, current control circuit 310, and control circuit 302 may be separate circuits. In other embodiments, cooling control circuit 306 and current control circuit 310 may be integrated into control circuit 302.

Magnetic field sensor 314 may measure the magnetic field around the magnetic coil and feedback signal 514*a*, representing the strength of the detected magnetic field, to control circuit 302. Magnetic field sensor 314 may be the same as or similar to magnetic field sensor 1110. Current sensor 316 may measure the value of the current flowing through the magnetic coil and feedback signal 516*a*, representing the value of the current. Also, temperature sensor 318, which may be the same or similar to temperature sensor 112, may measure the temperature of the magnetic coil and feedback signal 518*a*, representing the temperature, to control circuit 302.

System 300 may provide a plurality of feedback loops for controlling the magnetic coil. For example, system 300 may feedback temperature information (e.g. signal 518*a*), current information (e.g. signal 516*a*), and magnetic field strength information (e.g. signal 514*a*) to control circuit 302. Control circuit 302 may use these signals and the operating model 305 to control the current and cooling of the magnetic coil to operate the magnetic coil so it remains in a superconducting state and does not quench. Also, control circuit 302 may use these signals and the operating model 305 to minimize the time to energize the magnetic coil by providing the maximum allowable current so that the magnetic coil remains in a superconducting state.

In embodiments, control circuit 302 and/or cooling circuit 306 and/or current control circuit 310 may be implemented as state machines.

Figure 4:
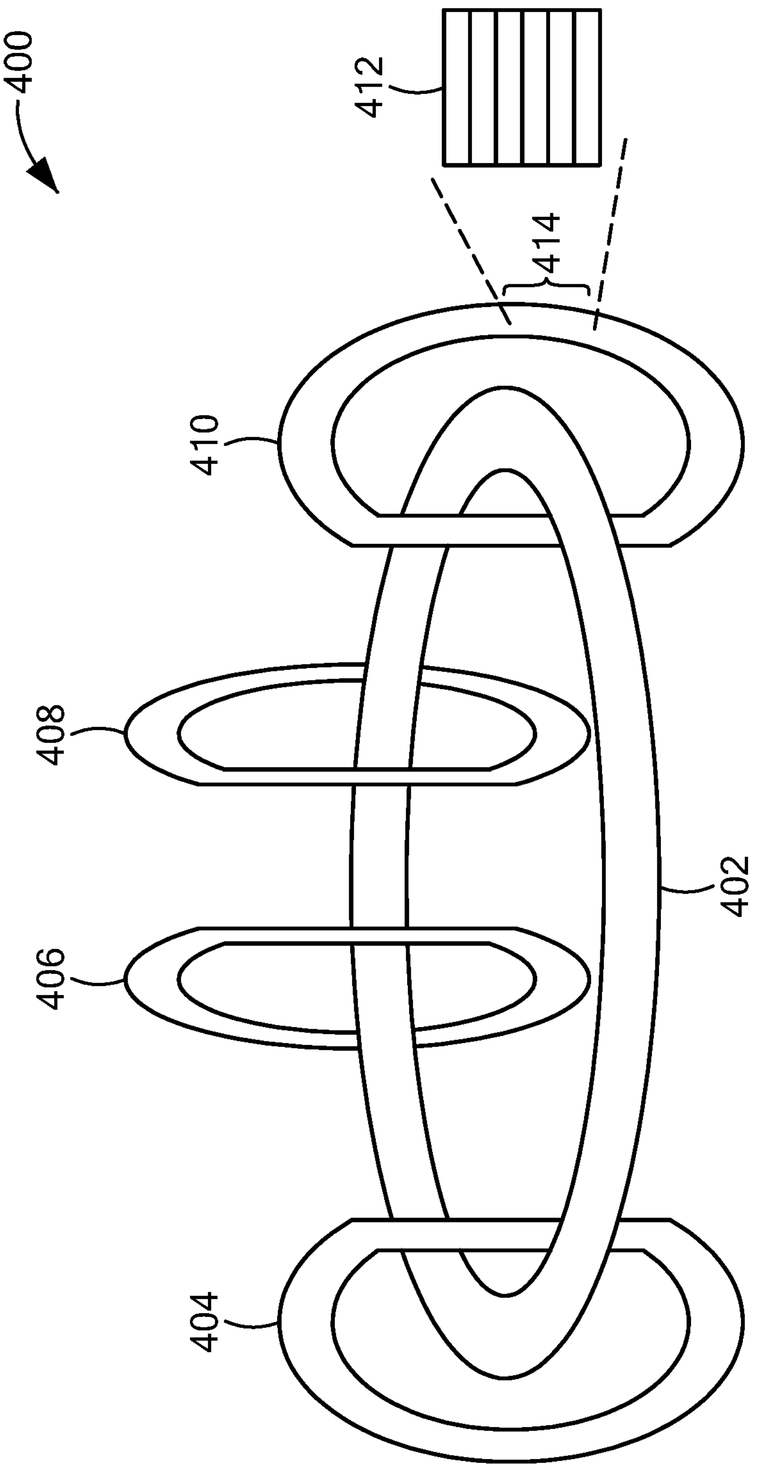
FIG. 4 is a perspective view of a simplified tokamak fusion power system.

The control systems described above may be used for various embodiments including, but not limited to fusion power systems. As an example, FIG. 4 is a diagram of a simplified tokamak system 400 for producing fusion power. The diagram includes a plasma tube 402 and a plurality of superconducting magnetic coils 404-410. These coils may be the same as or similar to magnetic coil 102 described above.

During energy generation, high temperature plasma (which fuels the fusion reaction) circulates within plasma tube 402. Because the plasma is at such high temperatures, if it were to contact the walls of plasma tube 402 it could destroy plasma tube 402. Thus, system 400 generates magnetic fields that compress and suspend the plasma into a stream within plasma tube 402 that does not contact the walls of plasma tube 402.

To generate the magnetic field, tokamak system 400 has a plurality of magnetic coils 404-410. These coils may comprise superconducting magnets to produce the magnetic field that suspends and compresses the plasma stream.

In embodiments, each magnetic coil 404-410 includes a series of stacked plates 412. Each stacked plate may enclose a superconducting magnet made from a coil of superconducting tape material. As current flows through the coil of superconducting tape, a magnetic field is generated.

Figure 4A:
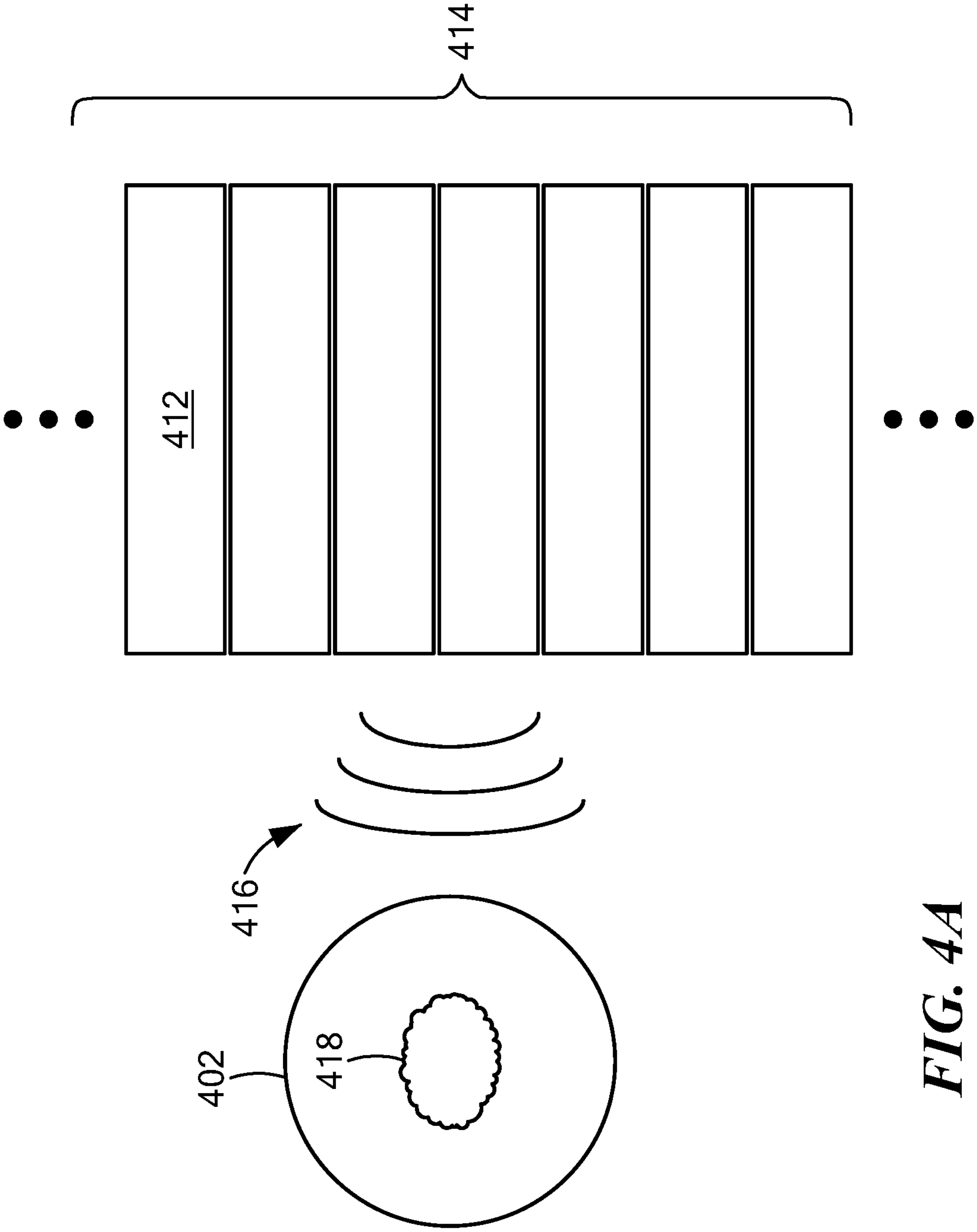
FIG. 4A is a block diagram of a portion of a magnetic coil in a fusion power system.

FIG. 4A is a diagram of a portion 414 of magnetic coil 410. As illustrated, magnetic coil 410 may comprise a series of stacked plates 412. Each plate may contain a superconducting magnet, which may be in the form of a coil, such as a coiled wire or tape for example. Driving electrical current through the superconducting tape may generate a magnetic field 416 that can compress plasma stream 418 so that the plasma does not contact plasma tube 402.

Figure 5:
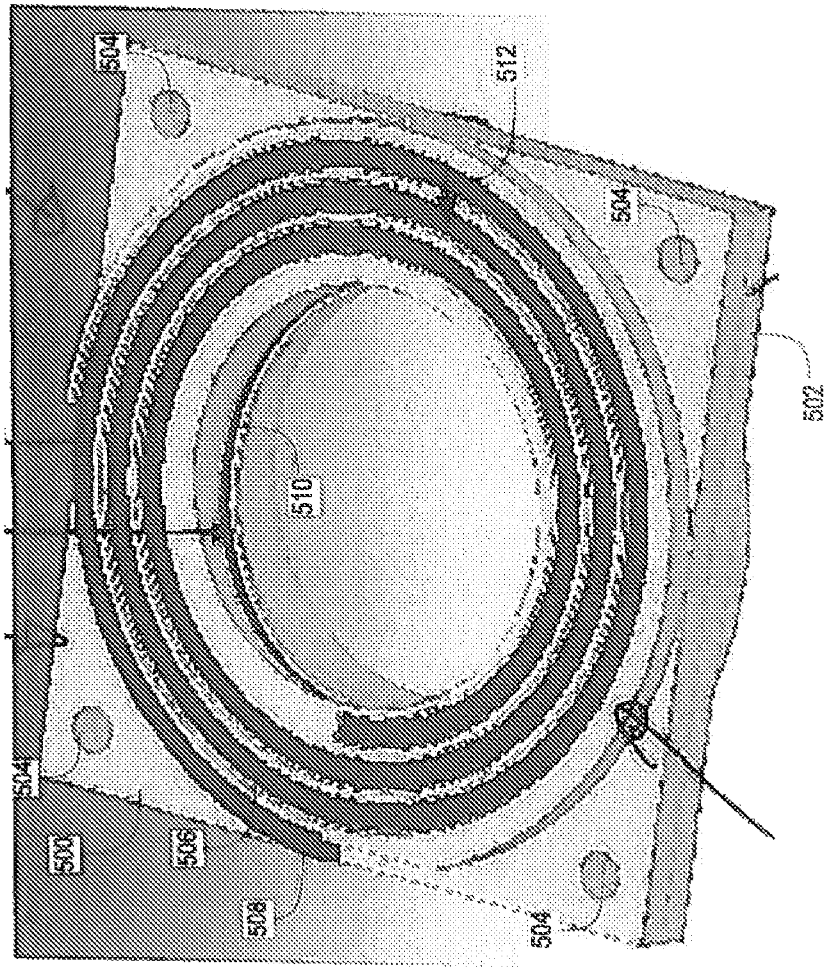
FIG. 5 is a perspective view of a spiral plate and superconducting tape for use in a superconducting magnet.

Referring now to FIG. 5, shown is an example of spiral-grooved plates stacked to form a so-called "double-pancake" assembly 500. In this illustration, two optionally identical spiral-grooved plates 501, 502 are coupled back-to-back with an insulating material (not visible in FIG. 5) inserted or otherwise disposed therebetween. Spiral-grooved, stacked-plate superconducting magnets and related spiral plates which may be the same as or similar to assembly 500 are described in co-pending application Ser. No. 16/233,410 filed on Dec. 27, 2018 and application Ser. No. 16/416,781 filed on May 20, 2019 each of which applications are hereby incorporated herein by reference in their entireties.

In the illustrative embodiment of FIG. 5, a first plate 501 is disposed over a second plate 502 such that interface apertures 504 are aligned and can be used to fasten the plates together. Plate 501 includes a spiral channel 506 defined by walls 507. Channel 506 (also sometimes referred to herein as a grooved path or a groove 506) is provided having a shape (i.e. a channel length, a channel width and a channel height) selected to receive a tape 508.

Tape 508 may be provided as a high temperature superconductor (HTS) tape stack that may include co-wind materials is inserted into the grooved channel which executes an in-going spiral on the top plate, a helix down to the bottom plate, and an out-going spiral on the bottom plate. In embodiments, tape 508 may be the same as or similar to the superconducting tape described in co-pending applications 62/740,163 filed on Oct. 2, 2018, Ser. No. 16/233,410 filed on Dec. 27, 2018 and application Ser. No. 16/416,781 filed on May 20, 2019 each of which applications are hereby incorporated herein by reference in their entireties.

In some embodiments, tape 508 is continuously wound (i.e., without breaks or segmentation) from a top surface to a bottom surface of the pancake assembly. In some embodiments, tape 508 may be a non-insulating (NI) HTS tape (and co-wind stack when used) which may be segmented or otherwise have breaks provided therein (e.g. the path of one material may be broken and not continuous). It should thus be appreciated that while the channel may be described as more or less continuous (even though a cross-sectional shape of a channel may change throughout the length of the channel), the material loaded or otherwise disposed in the channel may be continuous or may be provided in parts (e.g. segmented).

In some embodiments, more than one HTS tape stack may be disposed into the groove, with a material disposed between stacks that may engage mechanically with the plate, such as via spiral grooves, separately or in conjunction with the tape stacks. In some embodiments, some or all of the co-wind materials may be disposed to engage with the plate mechanically, such as via spiral grooves, separately or in conjunction with the tape stacks. The co-wind materials and surface coatings may be chosen to provide a desired (and ideally, an optimized) magnet quench behavior.

Assembly 500 is suitable for use in providing a superconducting magnet assembly such as may be used in any of the applications described herein.

Similar to plate 501, plate 502 has a tape 510 disposed in a channel thereof. In embodiments, tape 508 and tape 510 may be electrically coupled in series to form a longer winding of tape.

In embodiments, a superconducting magnet may be configured to operate without any turn-to-turn insulation. In other words, turns of tape 508 may be coiled atop each other and/or separated by a conductive material such as the material from which plates 501, 502 are provided.

When conditions are met such that tape 508 exhibits superconducting properties, its resistance to current may be ideally zero and in any event much lower than the resistance of normal conductors (conductors which do not exhibit superconducting properties) such as the material (e.g. metal) from which plates 501, 502 are provided. Under these conditions of relatively low voltages in the magnet, current is primarily confined to and flows primarily through the path defined by the channel in which tape 508 lies (i.e., the current flows though the superconductor) and a relatively small amount of current (and ideally no current) will pass from turn to turn of tape 508 (i.e., current will not flow across walls 507 which define the channels in which the tape 508, 510 lies and which separate the turns tape 508. 510).

If, however, conditions change so that, during operation, superconducting properties are lost (lost either in-whole or in-part), increased current flows from turn to turn of the magnet, in a direction shown by arrow 512 instead of flowing around the coil. This phenomenon, when the tape loses its superconducting properties and the current begins to flow from turn-to-turn, may be referred to as quenching.

Figure 6:
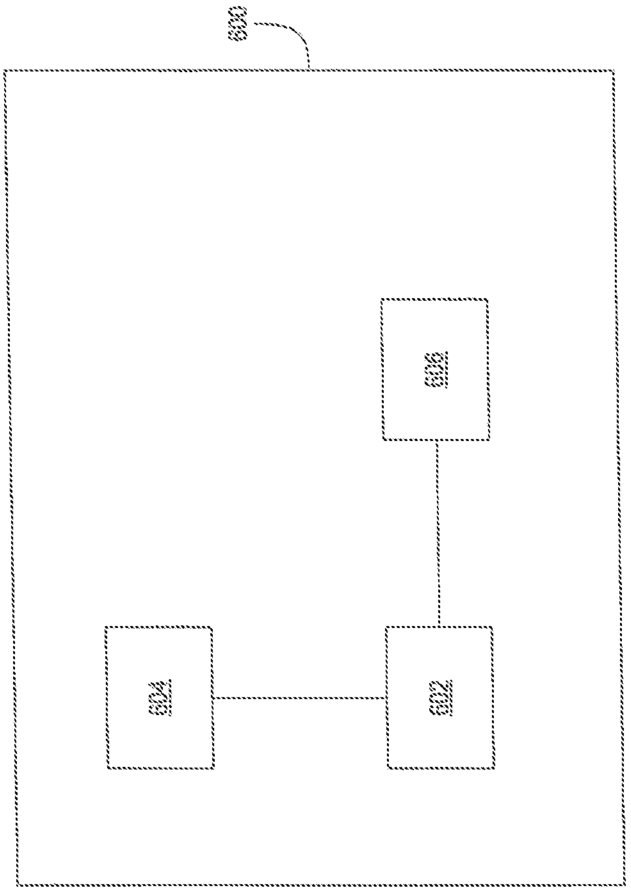
FIG. 6 is a block diagram of a computing device.

Referring to FIG. 6, some or all of the algorithms associated with control circuits 100 and 300, cooling control circuit 306, and/or current control circuit 310 may be implemented as software executing on a computing device, such as computing device 600. Computing device 600 may be a computer, a microprocessor, a custom processing circuit, an FPGA, or any type of circuit or computing device that can execute software instructions.

Computing device 600 includes a processor 602, a random-access memory (RAM) 604, and a storage device 606, which may be a hard drive, a CD, a DVD, a flash drive, or any other type of non-volatile memory. Software instructions may be stored in RAM 604 and/or storage device 606. Processor 602 may be coupled to storage device 606 and/or RAM 604 so that processor 602 can read the software instructions. As processor 602 reads the software instructions, the software instructions may cause processor 602 to perform operations, as described above in relation to control circuit 302 and/or control circuit 101, for operating a magnetic coil. Although not shown, processor 602 and/or computing device 600 may include other inputs and outputs, such as inputs for receiving the signals from the sensing elements, GPIO, power inputs, or other interfaces such as USB, SATA, HDMI, and the like.

In a system with multiple superconducting magnets, a number of these control systems may be coupled together.

In embodiments, the concepts described may facilitate commercialization of high-field magnets for use in fusion power plants (e.g. compact fusion power plants) as well as in high-energy physics applications. However, after reading the description provided herein, one of ordinary skill in the art will readily appreciate that the disclosed concepts are generally applicable for use in a wide range of other applications (e.g. a wide range of industrial uses) which may make use of high-field magnets. Such applications include but are not limited to: applications in the medical and life sciences field (e.g. magnetic resonance imaging and spectroscopy); applications in the chemistry, biochemistry and biology fields (e.g. nuclear magnetic resonance (NMR), NMR spectroscopy, electron paramagnetic resonance (EPR), and Fourier-transform ion cyclotron resonance (FT-ICR)); applications in particle accelerators and detectors (e.g. for use in health care applications such as in instruments for radiotherapy); application in devices for generation and control of hot hydrogen plasmas; applications in the area of transportation; applications in the area of power generation and conversion; applications in heavy industry; applications in weapons and defense; and applications in the area of high energy particle physics.

As noted above, although reference is sometimes made herein to the use of such high-field magnet assemblies in connection with fusion power plants (e.g. compact fusion power plants) and fusion research experiments (e.g., SPARC), such references are not intended to be, and should not be construed as, limiting. It is appreciated that control circuits and techniques provided in accordance with the concepts described herein for use in and with high-field magnet assemblies find use in a wide variety of different applications For example, in the medical and life sciences field, high-field magnets provided in accordance with the concepts described herein may find use in magnetic resonance imaging (MRI) and spectroscopy.

Figure 7:
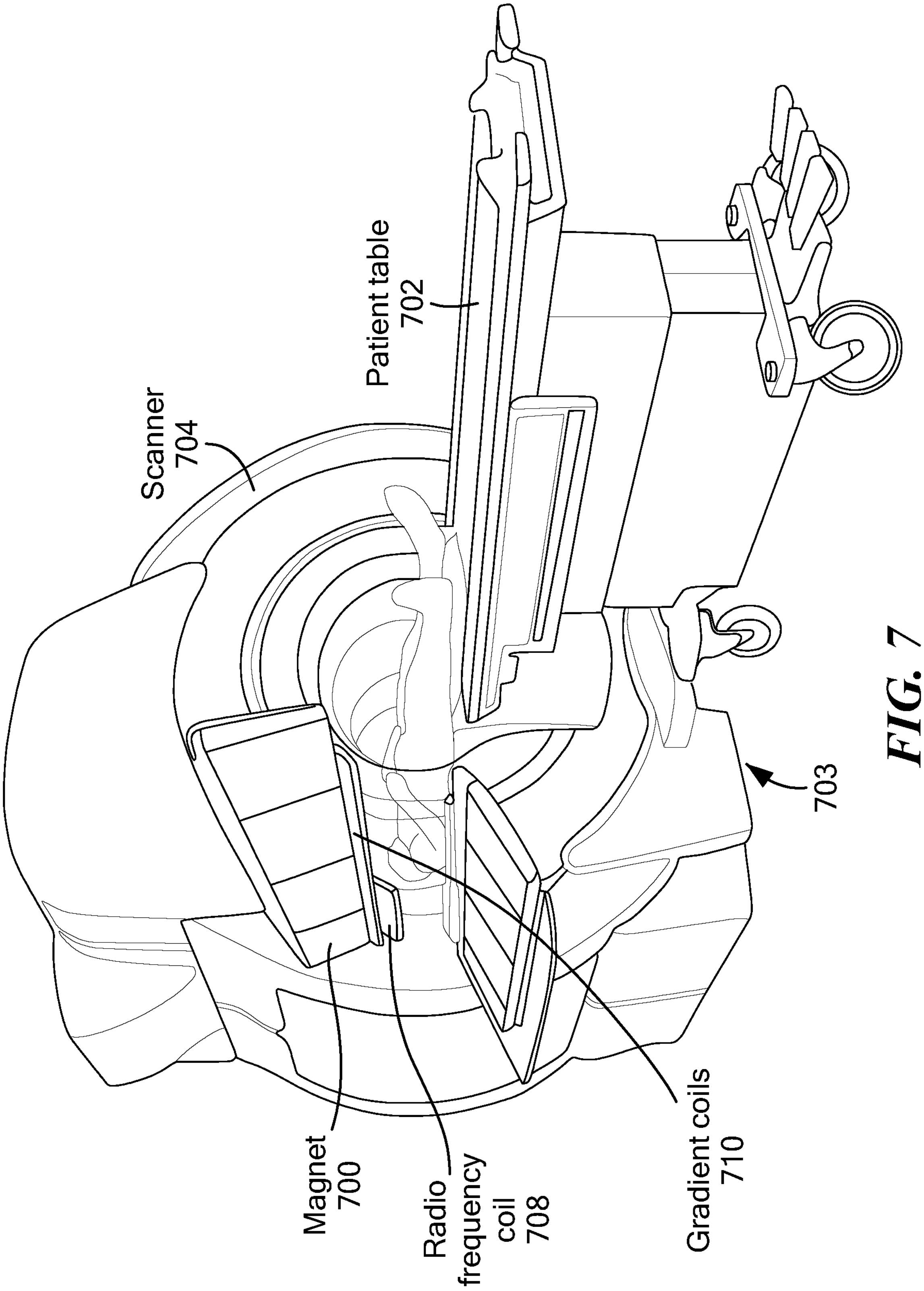
FIG. 7, an isometric partial cut-away view of an MM system which includes a control circuit which may be the same as or similar to the control circuit of FIGS. 1 and 3.

Referring to FIG. 7, an MRI system 700 comprises a patient table 702 on which the patient is delivered into a tube 703 defined by MRI system 700 for scanning. A scanner 704 uses magnets 706, radio frequency (RF) coils 708, and gradient coils 710 to create images. Maintaining such a large magnetic field requires a good deal of energy, which can be accomplished by using superconductive circuits. Thus, in embodiments, magnets 706 can be superconducting magnets controlled by a control circuit which may be the same as or similar to the control circuits described above in conjunction with FIGS. 1 and 3. In this way, MRI system 700 may be configured to use a strong magnetic field and radio waves to create detailed images of organs and tissues within a person's body.

Various embodiments are described in this patent. However, the scope of this patent should not be limited to the described embodiments, but rather should be limited only by the spirit and scope of the following claims. All references cited in this patent are incorporated by reference in their entirety.

The invention claimed is:

1. A system comprising:

a superconducting magnet comprising a coil of superconducting material, the coil comprising two electrical terminals, wherein windings of the coil are separated by a metallic conductor, wherein the superconducting magnet has no or partial electrical insulation between respective turns of the superconducting magnet;

a control circuit coupled to the two electrical terminals to drive a current through the coil to charge the superconducting magnet, and configured to provide a current through the coil that is sufficiently small to avoid a quenching effect of the superconducting magnet but also large enough to charge the superconducting magnet within a predetermined time period wherein the control circuit is configured to:

receive a sensed physical characteristic of the superconducting magnet from a sensor;

determine an electrical parameter to supply to the superconducting magnet based on the sensed physical characteristic and a model of the superconducting magnet stored in a computer-readable storage medium; and provide the determined electrical parameter to the superconducting magnet having no or partial electrical insulation between respective turns of the superconducting magnet; and a cooling structure thermally coupled to the coil to remove heat caused by charging the superconducting magnet with the current to allow for the current to be sufficiently large to charge the superconducting magnet within the predetermined time period without causing the quenching effect.

2. The system of claim 1 wherein the cooling structure is configured to maintain a temperature of the coil at 4 deg K or higher.

3. The system of claim 1 wherein the control circuit further comprises one or more feedback loops.

4. The system of claim 3 wherein the one or more feedback loops feeds back a temperature of the coil.

5. The system of claim 3 wherein the one or more feedback loops feeds back a current through the coil.

6. The system of claim 3 wherein the one or more feedback loops feeds back a magnetic field of the coil.

7. The system of claim 1 wherein the control circuit comprises a model of the coil.

8. The system of claim 7 wherein the model comprises a temperature limit of the coil, a current limit of the coil, and a magnetic field limit of the coil.

9. The system of claim 8 wherein the temperature limit, the current limit, and the magnetic field limit define a region within which the coil acts as a superconductor.

10. The system of claim 1, wherein the electrical parameter comprises the current and/or a voltage.

11. An apparatus for controlling a superconducting magnet having no or partial electrical insulation between respective turns of the superconducting magnet, the apparatus comprising:

a control circuit for controlling a superconducting magnet having no or partial electrical insulation between respective turns of the superconducting magnet, the control circuit configured to:

receive a sensed physical characteristic of the superconducting magnet from a sensor;

determine an electrical parameter to supply to the superconducting magnet based on the sensed physical characteristic and a model of the superconducting magnet stored in a computer-readable storage medium; and provide the determined electrical parameter to the superconducting magnet having no or partial electrical insulation between respective turns of the superconducting magnet.

12. The apparatus of claim 11, wherein the sensed physical characteristic comprises temperature, voltage, current, magnetic field and/or magnetic flux density.

13. The apparatus of claim 11, wherein the electrical parameter comprises a current and/or voltage.

14. The apparatus of claim 11, wherein the model represents a critical current of a superconductor of the superconducting magnet based on temperature, magnetic field and/or magnetic flux density.

15. The apparatus of claim 11, wherein the control circuit is further configured to:

after a time interval from the sensing of the physical characteristic, re-sense the physical characteristic;

re-determine, using a control circuit, the electrical parameter to supply to the superconducting magnet based on the re-sensed physical characteristic and the model; and provide the re-determined electrical parameter to the superconducting magnet.

16. The apparatus of claim 11, wherein the determining comprises calculating a critical current of a superconductor of the superconducting magnet, calculating an error of the critical current with respect to a setpoint and setting the electrical parameter based on the error.

17. The apparatus of claim 16, wherein the calculating of the error comprises dividing a calculated current through the superconductor by the critical current to produce a ratio, and comparing the ratio to a setpoint.

18. The apparatus of claim 11, wherein the determining comprises calculating future parameters of the superconducting magnet based on the sensed physical characteristic, and setting the electrical parameter based on the calculated future parameters.

19. The apparatus of claim 18, wherein the model comprises a thermal model of the superconducting magnet.

20. The apparatus of claim 11, wherein the control circuit is configured to determine a degree of cooling based on the model and the sensed physical characteristic, and controlling a cooling system for the superconducting magnet based on the determined degree of cooling.

* * * * *